UNITED STATES PATENT OFFICE 2,055,792

HYDROXYPHENYLAMINOANTHRACENES

Walter Hagge and Karl Haagen, Dessau in Anhalt, Germany, assignors to General Aniline Works, Inc., New York, a corporation of Delaware No Drawing. Application June 15, 1935, Serial No. 26,801. In Germany June 23, 1934

8 Claims. (Cl. 260—128)

Our present invention relates to a process for manufacturing hydroxyarylaminoanthracenes and to the new products obtainable by this process.

More particularly it relates to a process which comprises condensing a hydroxy or aminoanthracene in the presence of a bisulfite solution with a hydroxyaminobenzene.

The condensation reaction discovered by Bucherer and his co-workers, on which this process is based, namely the reaction of an aromatic amino or hydroxy compound with a sulfite, was not, according to the authors (Journal für praktische Chemie, vol. 71, page 443) extended to the anthraquinone series.

Now, we have found that a hydroxy or aminoanthracene may be condensed with a hydroxyaminobenzene by boiling these starting materials together with a bisulfite solution under reflux or in a closed vessel under pressure. In this manner there are obtained hitherto unknown compounds which are useful as intermediate products in the manufacture of dyes.

The following examples illustrate the invention, the parts being by weight unless otherwise stated and the parts by weight and parts by volume having the relationship which exists between the kilo and the liter:—

*Example 1.*—285 parts of 2-hydroxyanthracene-3-carboxylic acid, 2000 parts by volume of bisulfite lye of 25° Bé. and 170 parts of 4-amino-1-hydroxybenzene are heated together under reflux in an open vessel for 38 hours while stirring. The whole is allowed to cool to about 70° C., the condensation product is filtered and washed with hot water. The yield of 4'-hydroxyphenyl-2'-aminoanthracene is 334 parts and corresponds with 98 per cent. of the theoretical yield.

*Example 2.*—120 parts of 1-hydroxyanthracene, 85 parts of 4-amino-1-hydroxybenzene and 875 parts by volume of a sodium bisulfite lye of 25° Bé. mixed with 12 parts of sodium carbonate are together heated in a lead-lined stirring vessel for 40 hours under pressure at 120° C. After cooling the contents of the vessel to about 70° C., they are filtered and the solid matter is washed with hot water. There are obtained 95 parts of 4'-hydroxyphenyl-1-aminoanthracene, which corresponds with 54 per cent. of the theoretical yield.

*Example 3.*—119 parts of 2-hydroxyanthracene-3-carboxylic acid, a solution of 149 parts of 2-chloro-4-amino-1-hydroxybenzene-6-sulfonic acid in 1000 parts by volume of bisulfite lye of 25° Bé. and 50 parts by volume of sodium hydroxide solution of 35° Bé., are heated together as described in Example 1, under reflux and while stirring, for 42 hours.

After cooling to about 70° C., the mass is filtered and from the solid matter the excess of chloro-aminophenol-sulfonic acid is washed with hot water. The yield of 3'-chloro-4'-hydroxyphenol-2-aminoanthracene-5'-sulfonic acid amounts to about 90 per cent. of the theoretical yield.

It is obvious that our invention is not limited to the foregoing examples or to the specific details given therein. Thus, for instance, the concentration of the bisulfite lye, the temperature at which the reaction mixture is kept, and correspondingly the time of reaction may be varied within certain limits. Furthermore, it is not necessary that a chemically pure bisulfite lye may be used, the technical alkali bisulfite products, which contain a certain amount of neutral sulfite can be used in the same manner. Finally, the aminohydroxybenzene which is to be condensed with hydroxy- or aminoanthracenes may be the ortho- or meta-compound and it may contain other substituents, such as alkyl. In the foregoing examples the aminoanthracenes may be used instead of the hydroxy compounds.

What we claim is:—

1. The compounds which correspond to the general formula

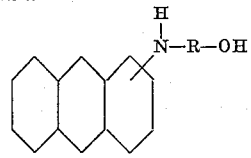

in which R is a member of the group consisting of phenylene radical and homologues thereof.

2. The compounds which correspond to the general formula

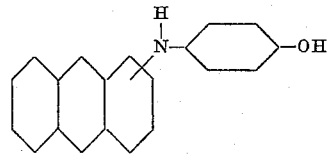

3. 4'-Hydroxyphenyl-1-aminoanthracene.
4. 4'-Hydroxyphenyl-2-aminoanthracene.
5. The process which comprises heating an anthracene compound of the general formula

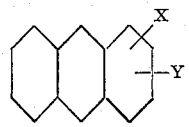

in which X is a member of the group consisting of OH and NH₂, and Y is a member of the group consisting of H and COOH, with a hydroxyaminobenzene in the presence of an alkali metal bisulfite solution.

6. The process which comprises heating an anthracene compound of the general formula

in which X is a member of the group consisting of OH and NH₂, and Y is a member of the group consisting of H and COOH, with 4-amino-2-hydroxybenzene in the presence of an alkali metal bisulfite solution.

7. The process which comprises heating 1-hydroxyanthracene with 4-amino-1-hydroxybenzene in the presence of an alkali metal bisulfite solution.

8. The process which comprises heating 2-hydroxyanthracene-3-carboxylic acid with 4-amino-1-hydroxybenzene in the presence of an alkali metal bisulfite solution.

WALTER HAGGE.
KARL HAAGEN.

DISCLAIMER 2,055,792.—*Walter Hagge* and *Karl Haagen*, Dessau in Anhalt, Germany. HYDROXY-PHENYLAMINOANTHRACENES. Patent dated September 29, 1936. Disclaimer filed July 22, 1937, by the assignee, *General Aniline Works, Inc.*

Hereby enters this disclaimer to certain of the claims of the above identified patent, and Hereby disclaims claim 4.

Hereby disclaims from the scope of claims 1 and 2 all compounds corresponding to the stated formula wherein the amino nitrogen atom is attached to a beta-carbon atom of the anthracene nucleus.

Hereby disclaims from the scope of claims 5 and 6 all processes employing anthracene compounds corresponding to the stated formula wherein "X" is attached to a beta-carbon atom of the anthracene nucleus.

(*Official Gazette August 24, 1937.*)